United States Patent
Kondo et al.

(10) Patent No.: US 11,347,086 B2
(45) Date of Patent: May 31, 2022

(54) OPTICAL ELEMENT

(71) Applicant: SUMITOMO OSAKA CEMENT CO., LTD., Tokyo (JP)

(72) Inventors: Katsutoshi Kondo, Tokyo (JP); Kiyotaka Nakano, Tokyo (JP); Eiji Murakami, Tokyo (JP); Junichiro Ichikawa, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 17/042,839

(22) PCT Filed: Feb. 27, 2019

(86) PCT No.: PCT/JP2019/007615
§ 371 (c)(1),
(2) Date: Sep. 28, 2020

(87) PCT Pub. No.: WO2019/187932
PCT Pub. Date: Oct. 3, 2019

(65) Prior Publication Data
US 2021/0026165 A1  Jan. 28, 2021

(30) Foreign Application Priority Data
Mar. 29, 2018 (JP) .............................. JP2018-065082

(51) Int. Cl.
*G02F 1/035* (2006.01)

(52) U.S. Cl.
CPC .......... *G02F 1/035* (2013.01); *G02F 2203/21* (2013.01)

(58) Field of Classification Search
CPC ..... G02F 1/035; G02F 2203/21; G02F 1/0316
See application file for complete search history.

(56) References Cited

U.S. PATENT DOCUMENTS

| 8,070,368 B1 | 12/2011 | Moody et al. |
| 2003/0062551 A1 | 4/2003 | Chen |

(Continued)

FOREIGN PATENT DOCUMENTS

| JP | 2798350 B2 | 7/1998 |
| JP | 2000-221458 A | 8/2000 |

(Continued)

OTHER PUBLICATIONS

"A Review of Lithium Niobate Modulators for Fiber-Optic Communications Systems", IEEE Journal of Selected Topics in Quantum Electronics, vol. 6, No. 1, pp. 69 (2000).

(Continued)

*Primary Examiner* — John Bedtelyon
(74) *Attorney, Agent, or Firm* — IpHorgan Ltd.

(57) ABSTRACT

To provide an optical element in which an electrode is directly formed on an LN substrate, and a drift phenomenon is suppressed. In an optical element including: a substrate made of lithium niobate crystals; and an electrode disposed on the substrate, the substrate and the electrode are in direct contact with each other, and as a contact metal disposed on a surface of the electrode where the electrode is in contact with the substrate, a metal material whose standard enthalpy of formation per coordinate bond upon oxidation is greater than a standard enthalpy of formation per coordinate bond of niobium pentoxide is used.

4 Claims, 10 Drawing Sheets

(56) References Cited

U.S. PATENT DOCUMENTS

| | | |
|---|---|---|
| 2004/0002205 A1 | 1/2004 | Chen et al. |
| 2004/0264832 A1 | 12/2004 | Kondo et al. |
| 2014/0219601 A1 | 8/2014 | Huang |
| 2014/0270617 A1 | 9/2014 | Muller et al. |
| 2016/0313503 A1 | 10/2016 | Takemura et al. |
| 2018/0074382 A1* | 3/2018 | Lee .................. G02F 1/292 |

FOREIGN PATENT DOCUMENTS

| | | |
|---|---|---|
| JP | 3954192 B2 | 5/2007 |
| JP | 4375597 B2 | 9/2009 |
| JP | 2013-210568 A | 10/2013 |

OTHER PUBLICATIONS

Higuma et. al., Electrode Design to Suppress Thermal Drift in Lithium Niobate Modulators, Electronics Letter, Nov. 23, 2000, vol. 36, No. 24, pp. 2013-2014.
Japan Patent Office, Tokyo, Japan—PCT/JP2019/007615—Written Opinion of the International Searching Authority, dated May 14, 2019.
Japan Patent Office, Tokyo, Japan—PCT/JP2019/007615—International Search Report, dated May 14, 2019.

* cited by examiner

OPTICAL ELEMENT

CROSS REFERENCE TO RELATED APPLICATIONS

This application is a national stage completion application of PCT Application No. PCT/JP2019/007615, filed Feb. 27, 2019, and claims priority from Japanese Application No. 2018-065082, filed Mar. 29, 2018. Each of these applications is incorporated by reference herein in its entirety.

TECHNICAL FIELD

The present invention relates to an optical element, and particularly to an optical element including a substrate made of lithium niobate crystals and an electrode disposed on the substrate.

BACKGROUND ART

Optical elements such as optical modulators using lithium niobate ($LiNbO_3$, hereinafter, referred to as "LN") as a substrate are frequently used in the technical field of optical communication and optical measurement.

For example, a waveguide type LN modulator has a small wavelength chirp and is capable of phase/intensity modulation, and hence the modulator is installed in a transmitter for high-speed/long-distance optical communication. In recent years, multi-level modulators in which a plurality of waveguides having a Mach-Zehnder (MZ) structure are integrated have been mainly used.

It is necessary to increase the modulation efficiency in order to achieve the integration, and a method of directly forming an electrode on an LN substrate is also employed (see Patent Literature No. 1) for a modulator having X-cut lithium niobate (LN).

Since an LN modulator is used for a backbone system of optical communication, the modulator is required to be operated for a long period of time (about 20 years). A drift phenomenon occurs as a problem in the long-term operation. Explanation and improvement of the drift phenomenon in the LN modulator have been performed in a structure in which a dielectric body (buffer (BF) layer) such as $SiO_2$ is interposed between an LN substrate and an electrode. In this structure, a positive drift phenomenon is exhibited, and is suppressed by adjusting the resistance of the BF layer by doping $SiO_2$ with In, Sn, or the like.

In a case where an electrode is directly formed on an LN substrate as described above, the above configuration has been rarely employed, and explanation and improvement of a cause of the drift phenomenon have not been performed much (see Patent Literature Nos. 1 and 3).

The method of directly forming an electrode on an LN substrate is, however, advantageous in integration and modulation efficiency. Accordingly, a prototype of an optical modulator in which an electrode was directly formed on an X-cut LN substrate was produced and subjected to the evaluation of the drift phenomenon.

Figure 1A:
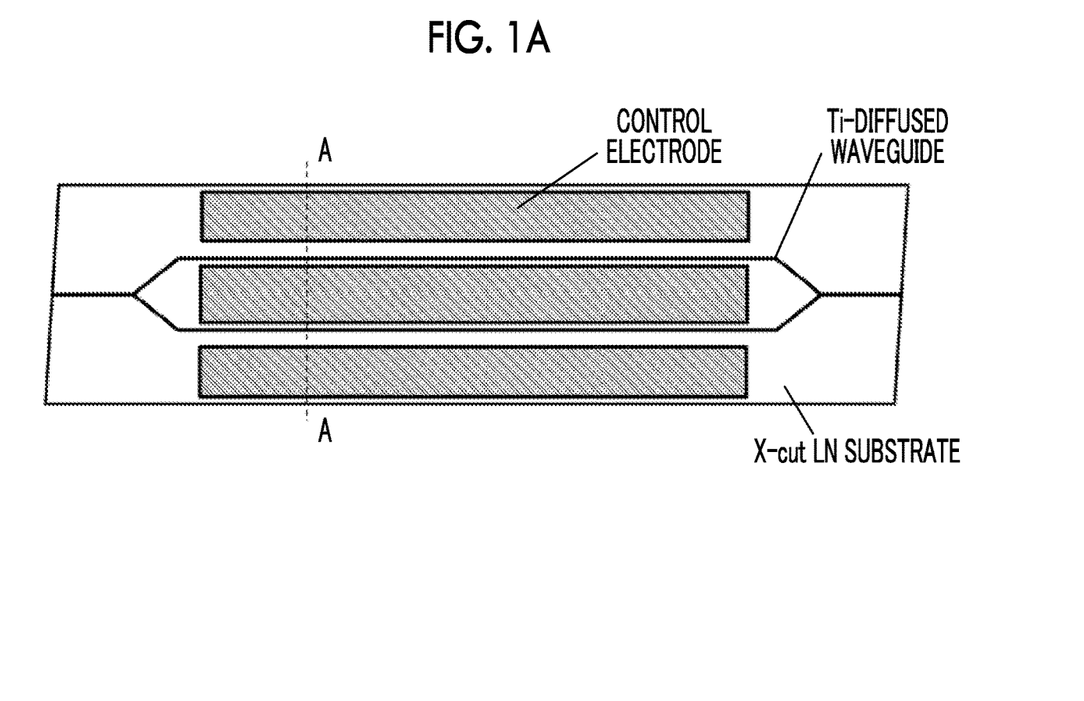
FIG. 1A is a plan view of an LN modulator subjected to a first drift phenomenon test.
Figure 1B:
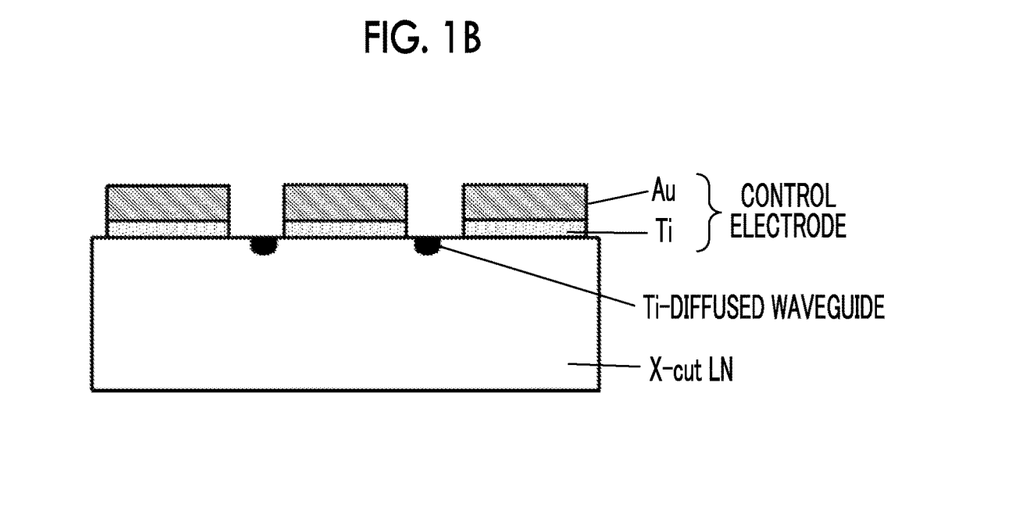
FIG. 1B is a cross-sectional view of the LN modulator subjected to the first drift phenomenon test.
Figure 2:
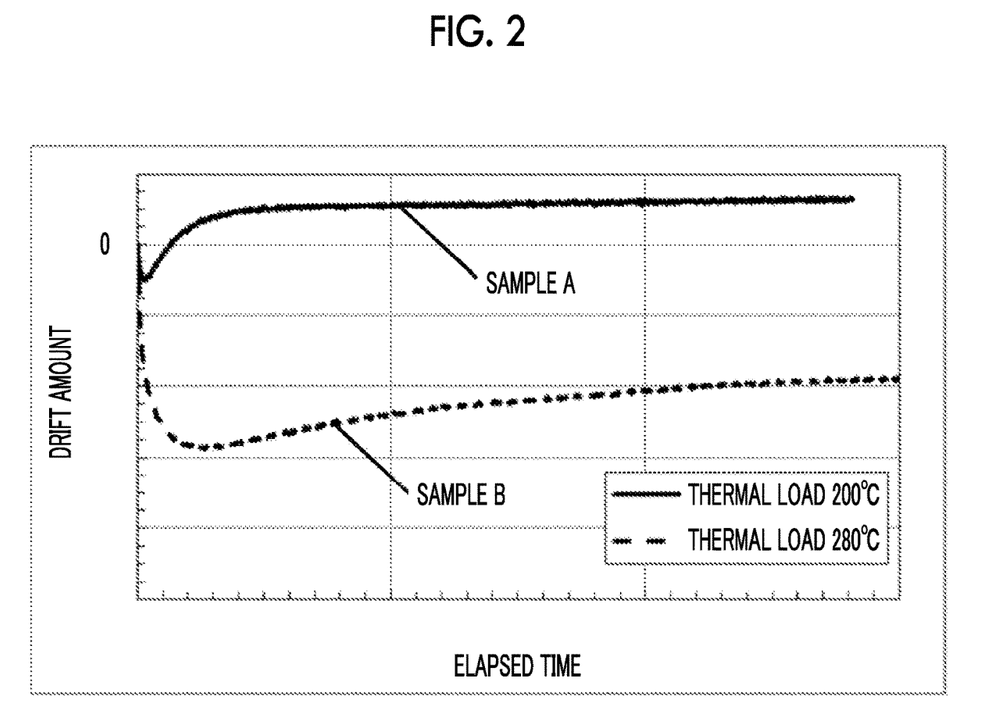
FIG. 2 is a graph showing results of the first drift phenomenon test performed using the LN modulator of FIGS. 1A and 1B.

In this test (first test), an optical modulator was used in which an optical waveguide with Ti diffused thermally was formed in an X-cut LN substrate and a control electrode was formed as shown in FIG. 1A. The electrode length was 40 mm, and the inter-electrode distance was set to 25 µm. As shown in FIG. 1B, which is a cross-sectional view taken along the dotted line A-A of FIG. 1A, Ti (Non Patent Literature No. 1, Patent Literature No. 2), which is generally used, was employed as a material (contact metal) of the control electrode in contact with the LN substrate, and an Au plating layer was formed on the contact metal. In a sample A, the optical modulator of FIGS. 1A and 1B was subjected to a thermal load at 200° C. for 1 hour without the application of a voltage before measurement, and in a sample B, the optical modulator of FIGS. 1A and 1B was subjected to a thermal load at 280° C. for 1 hour without the application of a voltage before measurement. FIG. 2 shows the behaviors of the drift phenomenon when a constant voltage is applied at 85° C. to the two samples A and B.

It is found that depending on the thermal load temperature, a drift amount greatly varies, and a change due to heat occurs. Since the direction of the drift is negative, the bias voltage acts in a direction of convergence (Patent Literature No. 4), and no problem occurs in actual use.

However, in the LN modulator in which an electrode is directly formed on an LN substrate, a difference occurs in the drift phenomenon only by a difference in the heating temperature before measurement as in the samples A and B, and it has not been possible to specify a cause of the occurrence of the drift. In addition, since the cause is not definitely known, it is difficult to guarantee the quality of the LN modulator. Moreover, it is required to frequently perform the bias control of the LN modulator.

CITATION LIST

Patent Literature

[Patent Literature No. 1] Japanese Patent No. 4375597
[Patent Literature No. 2] Japanese Patent No. 3954192
[Patent Literature No. 3] U.S. Pat. No. 8,070,368
[Patent Literature No. 4] Japanese Patent No. 2798350

Non Patent Literature

[Non Patent Literature No. 1] "A Review of LithiumNiobate Modulators for Fiber-Optic Communications Systems", IEEE Journal of Selected Topics in Quantum Electronics, Vol. 6, No. 1, pp 69 (2000)

SUMMARY OF INVENTION

Technical Problem

An object of the invention is to solve the above-described problems, and to provide an optical element in which an electrode is directly formed on an LN substrate, and a drift phenomenon is suppressed.

Solution to Problem

In order to achieve the above object, an optical element of the invention has the following technical features.

(1) An optical element including: a substrate made of lithium niobate crystals; and an electrode disposed on the substrate, in which the substrate and the electrode are indirect contact with each other, and as a contact metal disposed on a surface of the electrode where the electrode is in contact with the substrate, a metal material whose standard enthalpy of formation per coordinate bond upon oxidation is greater than a standard enthalpy of formation per coordinate bond of niobium pentoxide is used.

(2) The optical element according to (1), in which anyone of Co, Ni, Mo, W, and V is used as the contact metal.

(3) An optical element including: a substrate made of lithium niobate crystals; and an electrode disposed on the substrate, in which the substrate and the electrode are indirect contact with each other, and as a contact metal disposed on a surface of the electrode where the electrode is in contact with the substrate, an oxide conductor is used.

(3) The optical element according to anyone of (1) to (3), in which the substrate has a thickness of 20 µm or less.

Advantageous Effects of Invention

According to the invention, in an optical element including: a substrate made of lithium niobate crystals; and an electrode disposed on the substrate, the substrate and the electrode are indirect contact with each other, and as a contact metal disposed on a surface of the electrode where the electrode is in contact with the substrate, a metal material whose standard enthalpy of formation per coordinate bond upon oxidation is greater than a standard enthalpy of formation per coordinate bond of niobium pentoxide is used. Accordingly, it is possible to provide an optical element in which a drift phenomenon is suppressed.

According to the invention, in an optical element including: a substrate made of lithium niobate crystals; and an electrode disposed on the substrate, the substrate and the electrode are indirect contact with each other, and as a contact metal disposed on a surface of the electrode where the electrode is in contact with the substrate, an oxide conductor is used. Accordingly, it is possible to provide an optical element in which a drift phenomenon is suppressed.

DESCRIPTION OF EMBODIMENTS

Hereinafter, an optical element according to the invention will be described in detail.

The inventors have conducted intensive studies, and as a result, found that in a case where an electrode is directly formed on an LN substrate, the metal in contact with the substrate takes oxygen in the substrate and causes oxygen deficiency in the LN substrate, and a drift phenomenon thus occurs, and made the invention.

According to the invention, provided is an optical element including a substrate made of lithium niobate crystals and an electrode disposed on the substrate, in which the substrate and the electrode are in direct contact with each other, and as a contact metal disposed on a surface of the electrode where the electrode is in contact with the substrate, a metal material whose standard enthalpy of formation per coordinate bond upon oxidation is greater than a standard enthalpy of formation per coordinate bond of niobium pentoxide is used. Specifically, any one of Co, Ni, Mo, W, and V is preferably used as the contact metal.

Furthermore, in a case where a thin plate is used such that a thickness of the LN substrate is 20 µm or less, a ratio of a depth of an oxygen-deficient region to the thickness of the substrate is high, whereby a drift phenomenon more significantly occurs. Accordingly, in a case where an LN substrate having a thickness of 20 µm or less is used, the invention is expected to more effectively exert its effects.

Regarding the metal (contact metal) indirect contact with the LN substrate, in a case where a material such as Ni or W whose standard enthalpy of formation per coordinate bond upon oxidation is greater than that of $Nb_2O_5$ is used as the contact metal instead of Ti or Cr according to the related art, deprivation of the oxygen in the LN substrate by the contact metal can be suppressed, and a reduction in the electric resistance near the interface between the contact metal and the LN substrate can be suppressed. Accordingly, suppression of a change with the lapse of time in the amount of oxygen deficiency at the interface between the contact metal and the LN substrate and a high resistance of the LN substrate are maintained. As a result, a drift amount of the optical element such as an LN modulator is reduced, and a change of the drift phenomenon due to heat is suppressed.

Table 1 shows a list of standard enthalpies of formation of metal oxides corresponding to the bonding energies of metals and oxygen. The lower in Table 1, the easier the bonding of a metal to oxygen. Accordingly, in order to suppress oxygen deficiency in the LN substrate, a metal positioned above $Nb_2O_5$ in Table 1 is preferably selected as the contact metal.

TABLE 1

| Standard Enthalpies of Formation of Metal Oxides per Bond of Metal and Oxygen | |
|---|---|
| Species | $\Delta H°$ (kJ/mol)/bonds |
| $Ag_2O$ | −15.5 |
| PdO | −42.7 |
| $Rh_2O_3$ | −57.2 |
| CuO | −78.7 |
| $Cu_2O$ | −84.3 |
| $Bi_2O_3$ | −95.6 |
| CoO | −119.0 |
| NiO | −119.9 |
| $Sb_4O_6$ | −120.1 |
| $Fe_3O_4$ | −139.8 |
| $SnO_2$ | −144.4 |

TABLE 1-continued

Standard Enthalpies of Formation of Metal
Oxides per Bond of Metal and Oxygen

| Species | ΔH° (kJ/mol)/bonds |
|---|---|
| $GeO_2$ | −145.1 |
| $MoO_2$ | −147.4 |
| $WO_2$ | −147.4 |
| $In_2O_3$ | −154.3 |
| $V_2O_5$ | −155.1 |
| $BaO_2$ | −158.6 |
| $ZnO$ | −174.1 |
| $Nb_2O_5$ | −190.0 |
| $Cr_2O_3$ | −190.0 |
| $MnO$ | −192.6 |
| $Ta_2O_5$ | −204.6 |
| $B_2O_3$ | −212.3 |
| $VO$ | −215.9 |
| $SiO_2$ | −227.7 |
| $TiO_2$ | −236.2 |
| $TiO$ | −271.3 |
| $ZrO_2$ | −275.1 |
| $Al_2O_3$ | −279.3 |
| $EuO$ | −283.0 |
| $HfO_2$ | −286.2 |
| $SrO$ | −296.3 |
| $La_2O_3$ | −299.0 |
| $Li_2O$ | −299.0 |

However, Ag, Pd, Rh, and Cu have low adhesiveness to the LN substrate, and are not suitable as the contact metal. In addition, Sb and Ba should not be used since these have toxicity (or are suspected to be toxic substances). Fe has an extremely high magnetic permeability and increases microwave loss, and thus it is not suitable for a modulation electrode (control electrode) of an optical modulator or the like. Bi, Sn, and In have a low melting point, and thus a maximum temperature of the manufacturing process is limited. Therefore, these are not suitable for use in the manufacturing process. Ge is poor in deliquescence or the like. Zn is likely to form an alloy with other metals, and thus a problem occurs in the process design.

From the comprehensive consideration based on the above description, it can be said that Co, Ni, Mo, W, and V are effective in suppressing a drift amount and a change due to a thermal load. It can also be said that Cr, Ta, Si, Ti, Zr, Al, and the like below $Nb_2O_5$ are not suitable as the contact metal.

As the contact metal in contact with the substrate, the "metal material whose standard enthalpy of formation per coordinate bond upon oxidation is greater than a standard enthalpy of formation per coordinate bond of niobium pentoxide" has been described, but the contact metal is not limited to the above metal material. An "oxide conductor" can also be used. Since the oxide conductor is a metal material that has already been oxidized, it does not deprive oxygen from the LN substrate. Accordingly, in a case where the oxide conductor is used as the contact metal, DC drift is suppressed. Examples of the oxide conductor include indium tin oxide (ITO), $RuO_2$, and $IrO_2$.

In order to confirm the effects of the drift phenomenon due to the difference in the contact metal, a second test was performed using Al as a contact metal, and a third test was performed using Ni as a contact metal. Basically, the second and third tests are performed under the same conditions, except that the material of the contact metal is changed.

In each test, an X-cut LN substrate is subjected to Ti-film patterning, and thermal diffusion is performed to form a Ti-diffused waveguide. Parameters such as a Ti film thickness and a thermal diffusion temperature are disclosed in Non Patent Literature No. 1, but in the above tests, the Ti film thickness is 90 nm, and thermal diffusion is performed at 990 degrees for 15 hours.

Next, 100 nm of a contact metal film was formed on the X-cut LN substrate in which the Ti-diffused waveguide was formed. 50 nm of an Au film was sequentially accumulated on the contact metal film by vacuum deposition. After that, a control electrode (electrode length: 40 mm, inter-electrode distance: 25 μm) having a thickness of 3 μm is formed by photolithography and electrolytic gold plating.

Figure 3A:
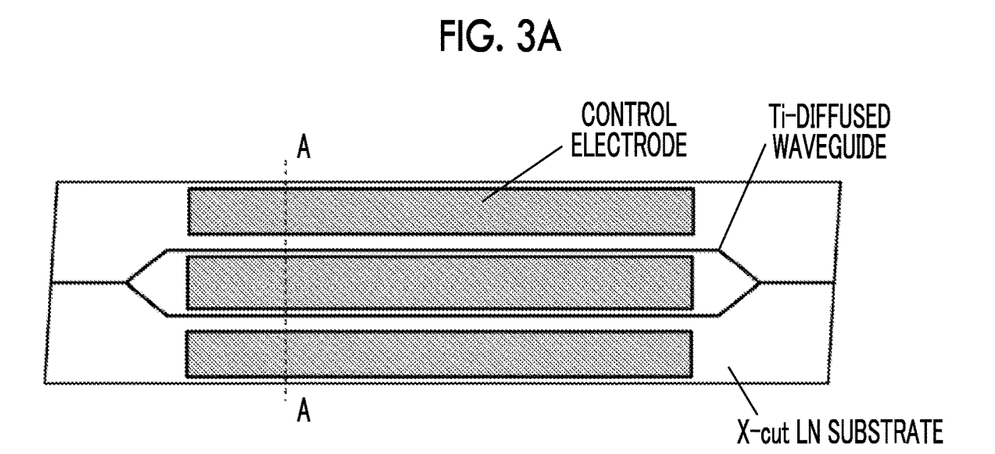
FIG. 3A is a plan view of an LN modulator subjected to a second drift phenomenon test.
Figure 3B:
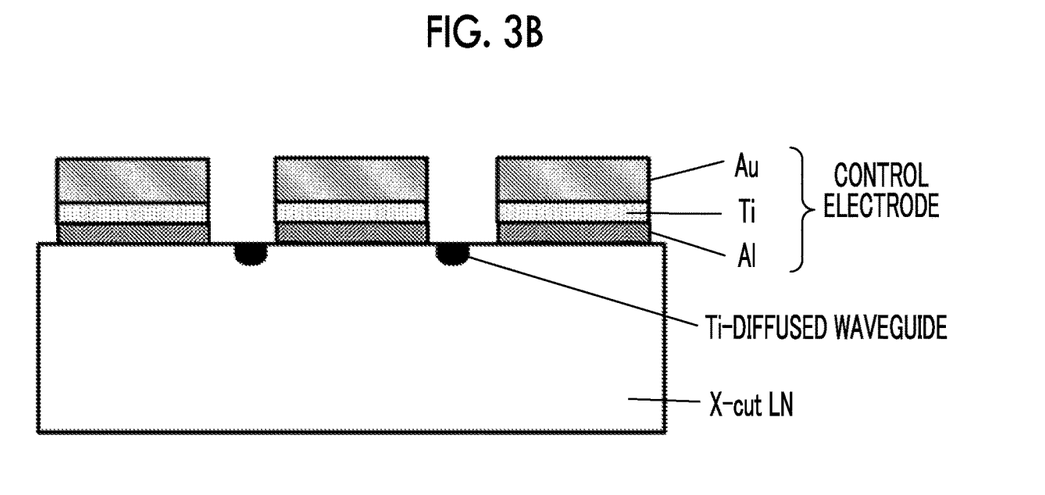
FIG. 3B is a cross-sectional view of the LN modulator subjected to the second drift phenomenon test.

In the second test, an LN modulator shown in a plan view of FIG. 3A and a cross-sectional view of FIG. 3B was made. In particular, Al is used as a contact metal, and Ti (thickness: 100 nm) is inserted between Al and Au in order to suppress an alloy reaction between Al and Au due to a thermal load (see FIG. 3B).

Figure 4:
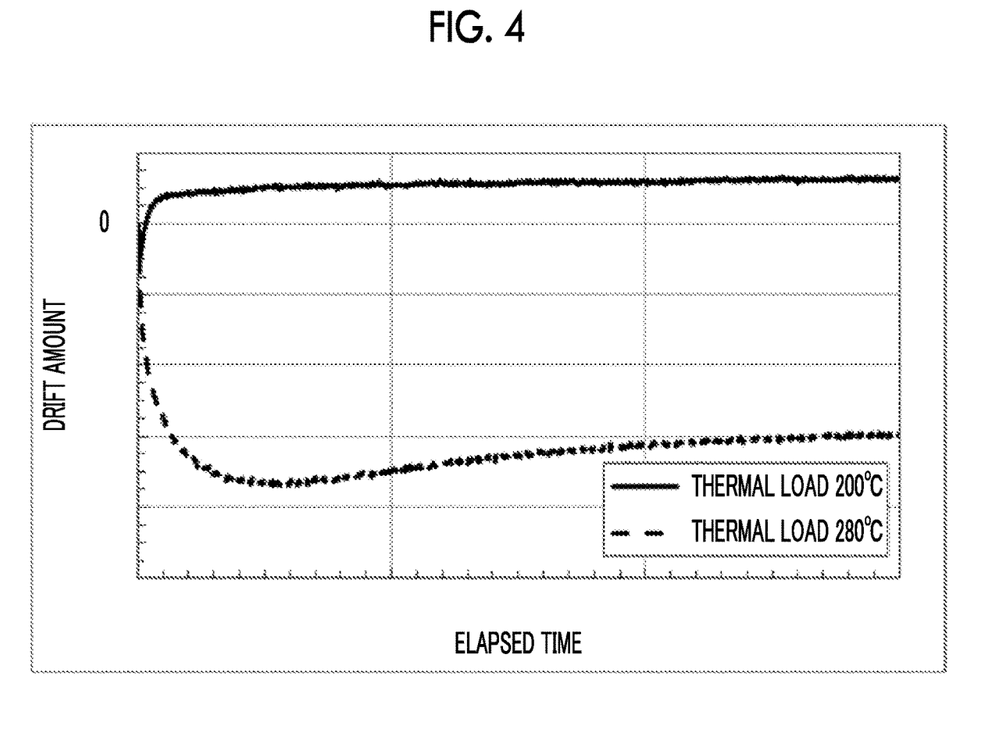
FIG. 4 is a graph showing results of the second drift phenomenon test performed using the LN modulator of FIGS. 3A and 3B.

An LN modulator provided as shown in FIGS. 3A and 3B and subjected to a thermal load at 200° C. for 1 hour without the application of a voltage before measurement, and an LN modulator provided as shown in FIGS. 3A and 3B and subjected to a thermal load at 280° C. for 1 hour without the application of a voltage before measurement were prepared. Evaluation results of a drift phenomenon occurring when a constant voltage is applied (an 8 V voltage is applied) to the LN modulator at 85° C. are shown in FIG. 4.

It can be confirmed that the drift phenomenon more significantly changes due to the thermal load, as in the graph shown in FIG. 2 when the contact metal is Ti. The reason for this is presumed to be that oxygen defects occurring in the LN substrate are increased since Al is used as the contact metal instead of Ti.

In the third test, an LN modulator using Ni as a contact metal was made. An Au film between electrodes and a Ni film of the contact metal are removed by chemical etching or the like. An iodine-potassium iodide aqueous solution is preferably used as an etching solution for the Au film, and a dilute nitric acid or the like is preferably used as an etching solution for the Ni film. The LN modulator used in the third test is shown in a plan view of FIG. 5A and a cross-sectional view of FIG. 5B.

Figure 5A:
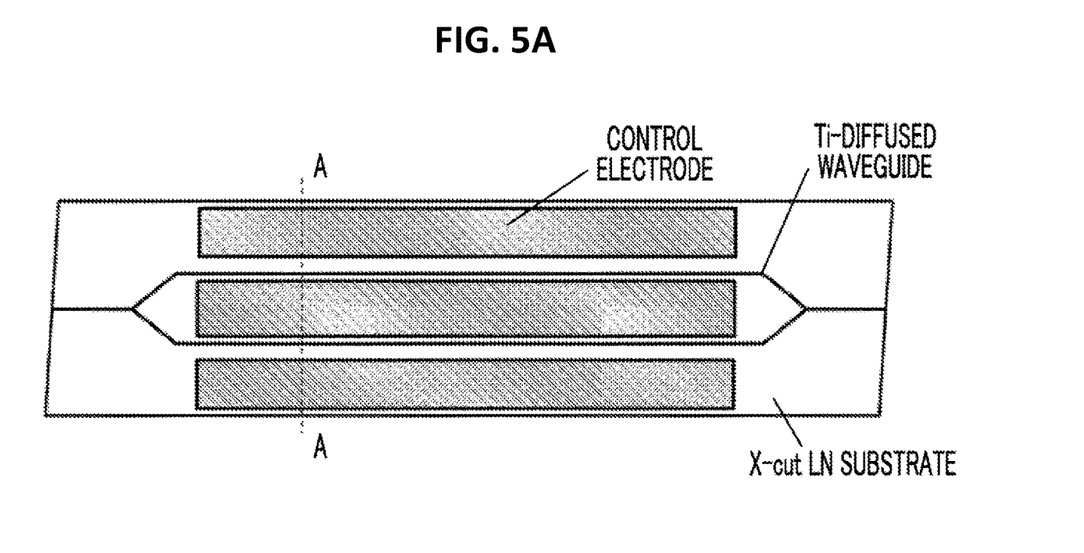
FIG. 5A is a plan view of an LN modulator subjected to a third drift phenomenon test.
Figure 5B:
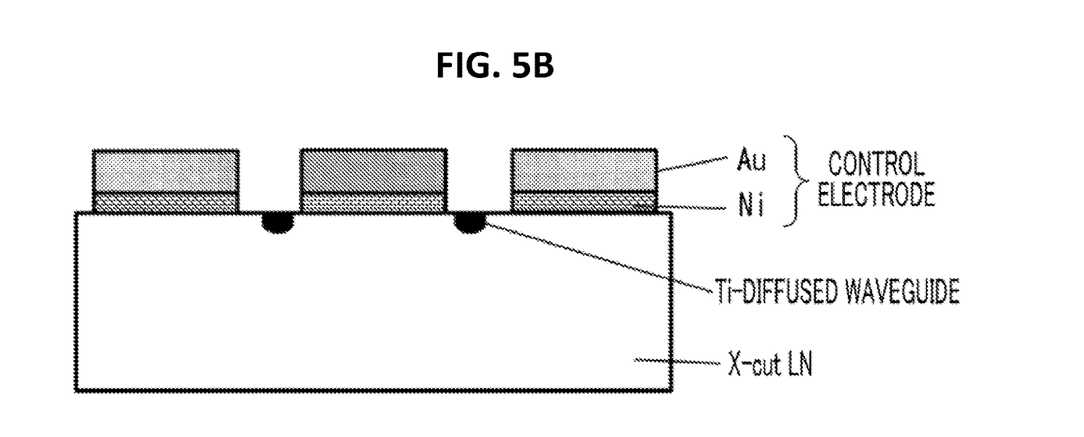
FIG. 5B is a cross-sectional view of the LN modulator subjected to the third drift phenomenon test.
Figure 6:
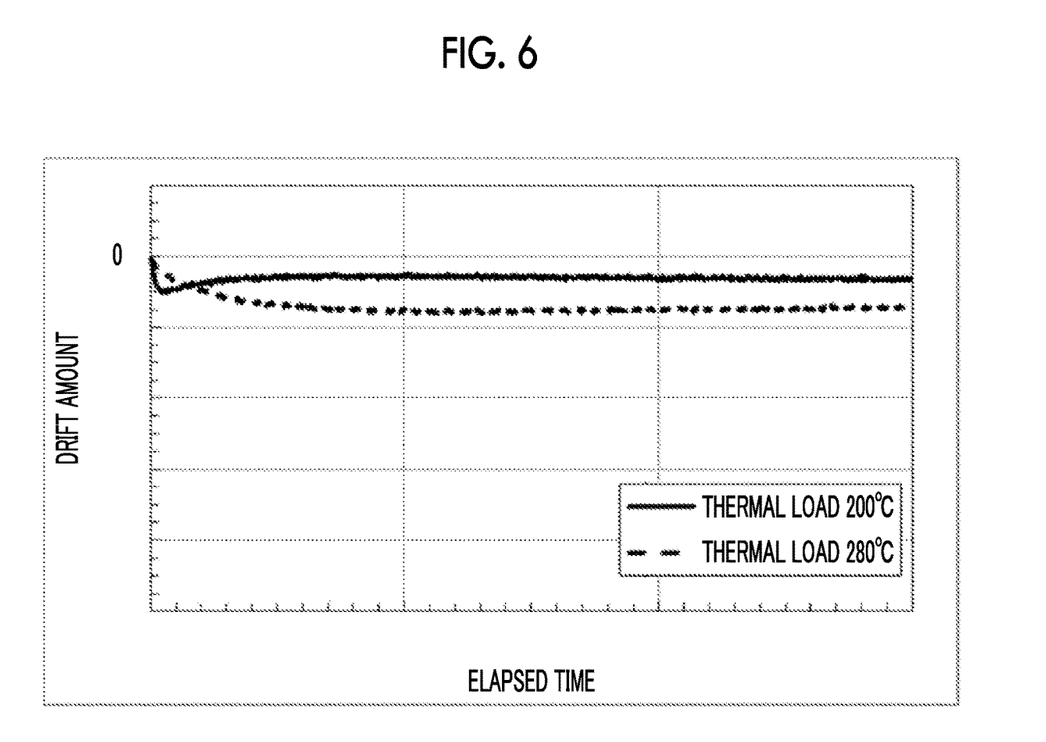
FIG. 6 is a graph showing results of the third drift phenomenon test performed using the LN modulator of FIGS. 5A and 5B.

An LN modulator provided as shown in FIGS. 5A and 5B and subjected to a thermal load at 200° C. for 1 hour without the application of a voltage before measurement, and an LN modulator provided as shown in FIGS. 5A and 5B and subjected to a thermal load at 280° C. for 1 hour without the application of a voltage before measurement were prepared. Evaluation results of a drift phenomenon occurring when a constant voltage is applied (an 8 V voltage is applied) to the LN modulator at 85° C. are shown in FIG. 6. As shown in FIG. 6, in a case where Ni was used as a contact metal, changes due to the thermal load were rarely shown in the drift phenomenon.

As is obvious from the graphs shown in FIGS. 2, 4 and 6, it is understood that the drift phenomenon changes by the contact metal in the LN modulator in which the electrode is directly formed on the LN substrate. Moreover, it is presumed that the contact metal takes oxygen from the LN substrate and causes oxygen deficiency in the LN substrate, and as a result, the drift phenomenon changes due to the thermal load before measurement.

Next, in a case where the contact metal deprives oxygen in the LN substrate, not only the accelerated change due to the thermal load but also the accelerated change due to the applied voltage are considered. Accordingly, a sample in which Ti was used as a contact metal was prepared, and a fourth test was performed to examine a temporal change of the current between electrodes during the application of a constant voltage.

Figure 7A:
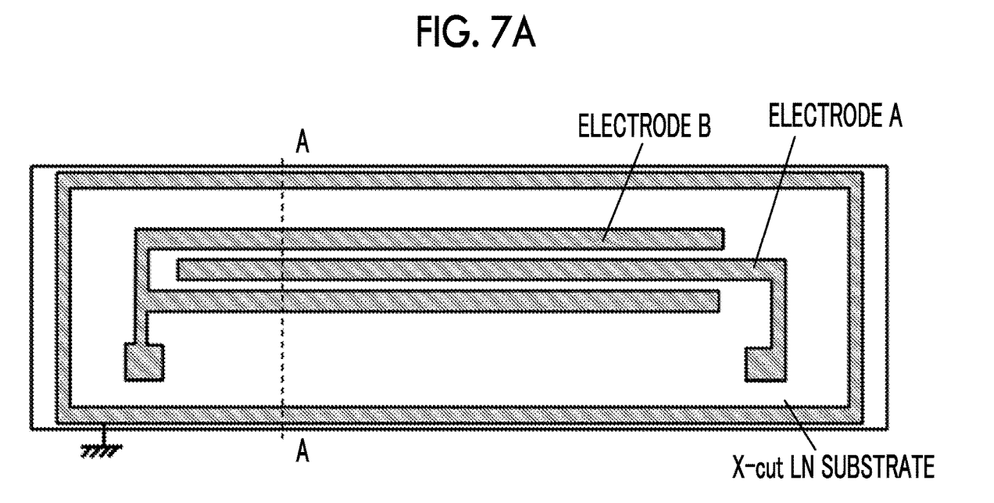
FIG. 7A is a plan view of a test sample subjected to a fourth test.
Figure 7B:
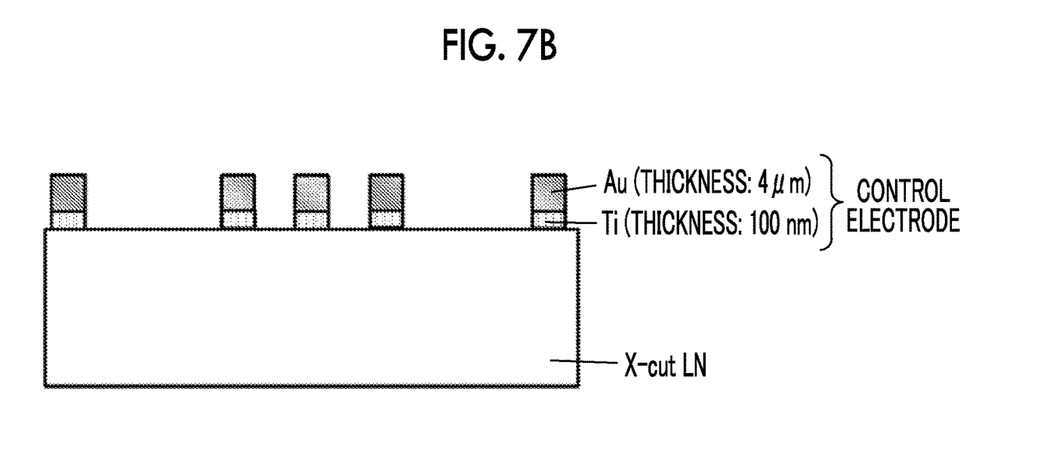
FIG. 7B is a cross-sectional view of the test sample subjected to the fourth test.

In the test sample, in order to avoid an error in the measurement, a guard electrode is disposed along an outer periphery of an LN substrate as shown in a plan view of FIG. 7A and a cross-sectional view of FIG. 7B, and electrodes having a comb-like structure (electrodes A and B) are provided. As shown in FIG. 7A, comb-like electrodes having an electrode length of 10 mm and an inter-electrode distance of 15 μm are formed, and electrodes A and B are separated from the ground electrode at the outer periphery by 100 μm or more. As shown in FIG. 7B, 100 nm of a contact metal Ti is formed on the LN substrate, and 4 μm of an Au plating is formed on an upper surface of the contact metal Ti.

Figure 8:
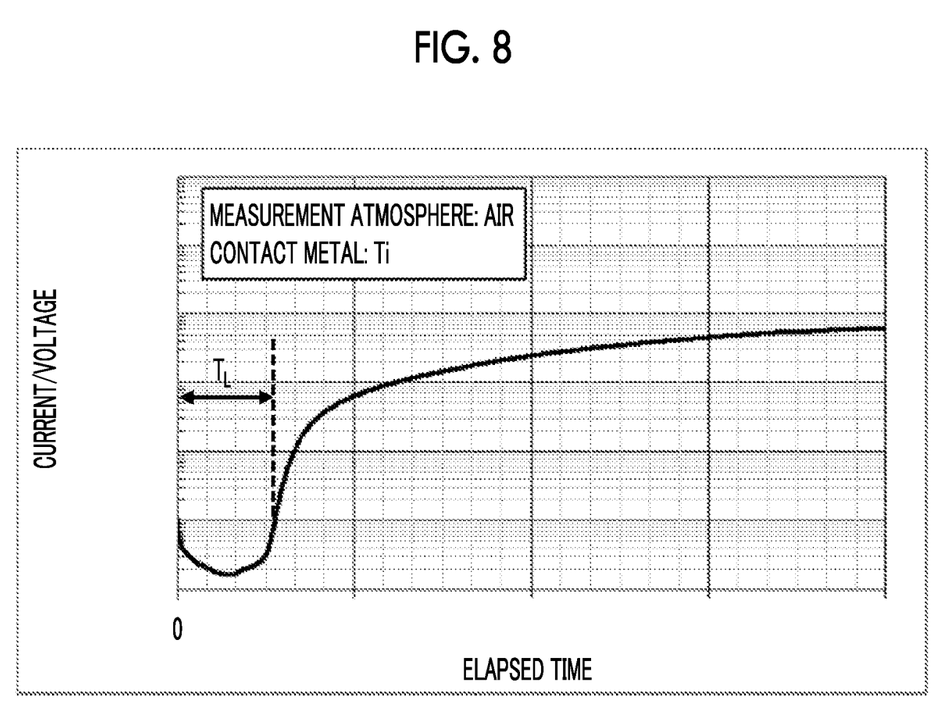
FIG. 8 is a graph showing results of the fourth test (elapsed time and change in current/voltage).

A desired voltage is applied to the electrode A, and the voltage of the electrode B is set to 0V. A current flowing through the electrode B at this time is evaluated. An example of the measurement results is shown in FIG. 8. In FIG. 8, the voltage applied to the electrode A is 60V. A change with the lapse of time in the conductivity (reciprocal of resistance) of the LN substrate under air atmosphere is measured. As shown in FIG. 8, the current does not flow so much at the beginning of the voltage application, but the current suddenly starts to flow at a certain time. The double-headed arrow portion shown in FIG. 8 is defined as a "current rise time ($T_L$)".

Figure 9:
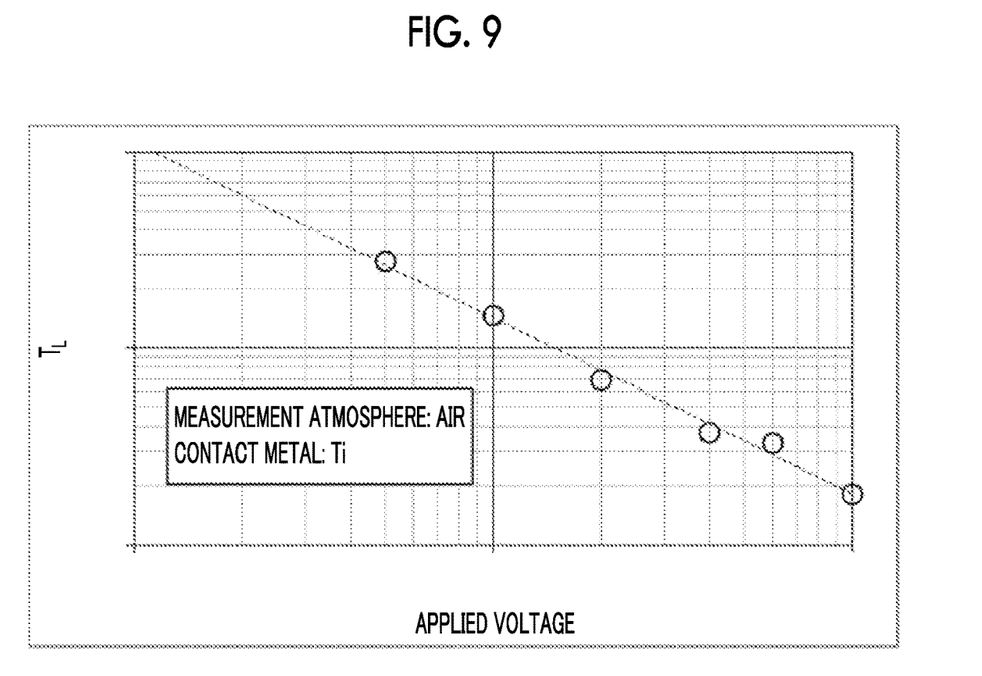
FIG. 9 is a graph showing results of the fourth test (relationship between applied voltage and current rise time $T_L$).

FIG. 9 shows results of examination of the relationship between the current rise time ($T_L$) and the applied voltage. FIG. 9 is a double logarithmic chart, and it is found that the measurement results are on a straight line.

Figure 10:
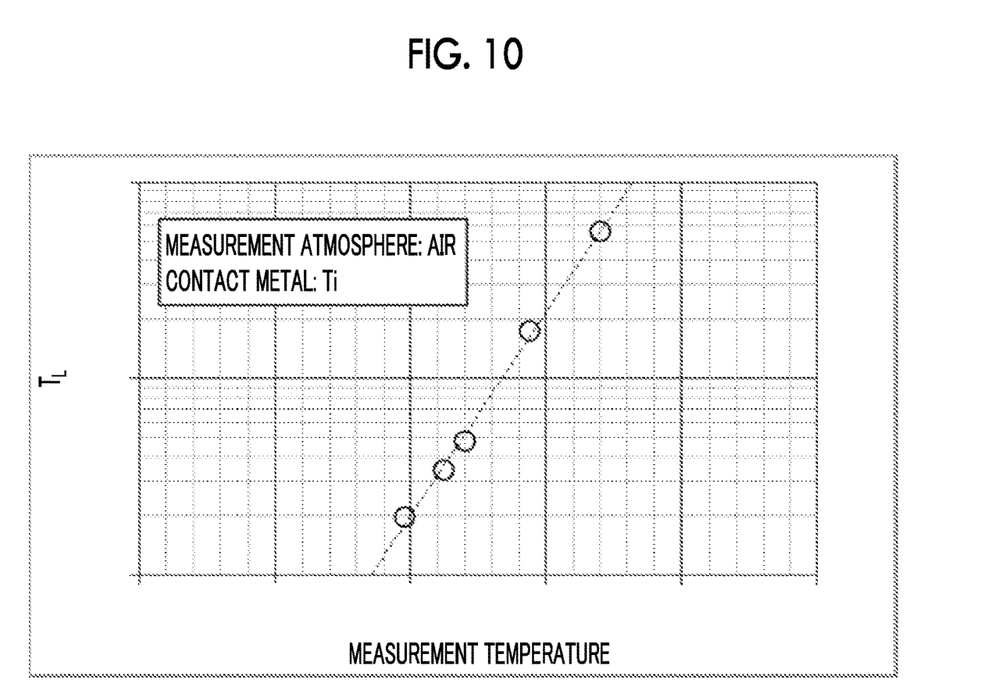
FIG. 10 is a graph showing results of the fourth test (relationship between measurement temperature and current rise time $T_L$).

FIG. 10 shows results of examination of temperature (T) dependence at a fixed applied voltage. FIG. 10 is a single logarithmic chart, and the relationship between $T_L$ and a temperature (T) follows the Arrhenius equation. That is, in a case where Ti is used as a contact metal, $T_L$ follows the Eyring's model represented by Expression 1.

$$T_L = AV^n \exp\left[\frac{E_a}{k_B T}\right]$$

($E_a$: activation energy, $k_B$: Boltzmann constant, A, n: constant)

From the results, it is possible to understand the reason for a change in the behavior of the drift when the LN modulator using Ti as a contact metal is used at a high temperature and a high voltage for a long period of time. The Eyring's model is used for predicting the life of ceramic capacitors, and it has been known that the mechanism of leakage current of ceramic capacitors is related to oxygen deficiency. Similarly, it is presumed that the LN substrate also has a low resistance due to oxygen deficiency.

In contrast, in a case where the contact metal in FIG. 7 was replaced from Ti to Ni, the current rise phenomenon shown in FIG. 8 did not occur. Accordingly, it was not possible to define the above-described $T_L$. The result of this comparative test is consistent with the result that the drift phenomenon due to the heat treatment did not occur with the contact metal Ni in FIGS. 5A, 5B, and 6.

Figure 11:
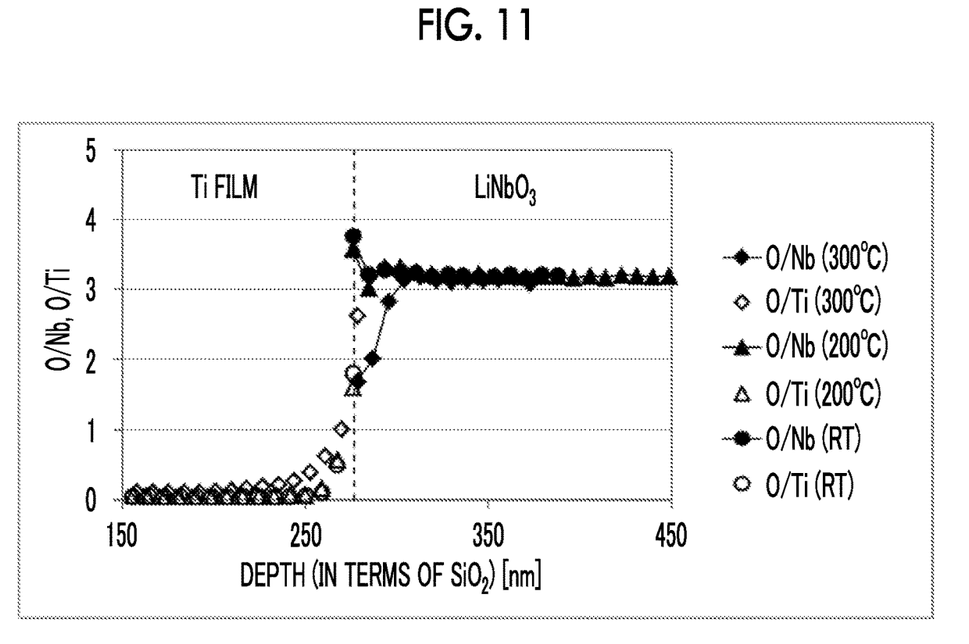
FIG. 11 is a graph showing results of Auger electron spectroscopy (AES) analysis in a depth direction from a Ti film to an LN substrate.

A test was performed to confirm that the contact metal causes oxygen deficiency at the interface with the LN substrate. First, a Ti film having a film thickness of 200 nm was accumulated on an X-cut LN substrate. The substrate was divided into three, and three types of thermal loads (none, 200° C., 300° C.) were applied. FIG. 11 shows results of Auger electron spectroscopy (AES) analysis of the three samples in a depth direction from the Ti film to the LN substrate.

In the sample subjected to a thermal load at 300° C. in FIG. 11, it is understood that near the surface of the LN substrate, oxygen is deprived from the LN substrate, and near the surface of the Ti film in contact with the LN substrate, the oxygen amount is increased and the Ti film is oxidized.

INDUSTRIAL APPLICABILITY

As described above, according to the invention, it is possible to provide an optical element in which an electrode is directly formed on an LN substrate, and a drift phenomenon is suppressed.

We claim:

1. An optical waveguide element comprising:
   a substrate made of lithium niobate crystals;
   an optical waveguide formed in the substrate; and
   an electrode disposed on only one surface of the substrate to apply electric field to the optical waveguide,
   wherein the electrode consists of a contact metal film which is in direct contact with the substrate and a metal layer disposed only on the contact metal film, and
   as the contact metal film, a metal material whose standard enthalpy of formation per coordinate bond upon oxidation is greater than a standard enthalpy of formation per coordinate bond of niobium pentoxide is used.

2. The optical waveguide element according to claim 1, wherein any one of Co, Ni, Mo, W, and V is used as the contact metal film.

3. The optical waveguide element according to claim 1, wherein the substrate has a thickness of 20 μm or less.

4. The optical waveguide element according to claim 1, wherein Au is used as the metal layer.

* * * * *